United States Patent
Liu et al.

(10) Patent No.: US 12,037,299 B1
(45) Date of Patent: Jul. 16, 2024

(54) METHOD FOR PREPARING SMALL-MOLECULE ORGANIC WATER-SOLUBLE FERTILIZER USING BIOMASS AND ITS WASTE, AND PRODUCT AND APPLICATION THEREOF

(71) Applicants: Wenzhi Liu, Guangzhou (CN); Min He, Dongguan (CN); Lecheng Xiao, Hanchuan (CN); Poxi He, Nanning (CN)

(72) Inventors: Wenzhi Liu, Guangzhou (CN); Min He, Dongguan (CN); Lecheng Xiao, Hanchuan (CN); Poxi He, Nanning (CN)

( * ) Notice: Subject to any disclaimer, the term of this patent is extended or adjusted under 35 U.S.C. 154(b) by 0 days.

(21) Appl. No.: 18/234,926

(22) Filed: Aug. 17, 2023

(30) Foreign Application Priority Data

Jun. 1, 2023 (CN) .......................... 202310644937.1

(51) Int. Cl.
*C05F 3/04* (2006.01)
*C05F 9/00* (2006.01)
*C05F 11/02* (2006.01)

(52) U.S. Cl.
CPC .................. *C05F 3/04* (2013.01); *C05F 9/00* (2013.01); *C05F 11/02* (2013.01)

(58) Field of Classification Search
None
See application file for complete search history.

(56) References Cited

U.S. PATENT DOCUMENTS

2009/0229331 A1* 9/2009 Wells ....................... C05G 5/27
71/23

FOREIGN PATENT DOCUMENTS

| CN | 106588313 A | * | 4/2017 | ............... C05G 3/00 |
| CN | 115215700 A | * | 10/2022 | ............... C05F 17/10 |

* cited by examiner

*Primary Examiner* — Wayne A Langel
(74) *Attorney, Agent, or Firm* — Bay State IP, LLC

(57) ABSTRACT

The present disclosure discloses a method for preparing a small-molecule organic water-soluble fertilizer. In the method, the biomass is crushed by collision into pulp, added with a trace element and a catalyst, and hydrolyzed and complete a chelation reaction, added with an inorganic fertilizer for nanometerization, subjected to vacuum evaporation and concentration and then added with a stabilizer, and ultrasonically homogenized to obtain the small-molecule organic water-soluble fertilizer. The pressurized differential speed gradient stirring effectively improves the degree of chelation between the trace element and the biomass; catalytic hydrolysis of the biomass with increasing the pressure improves the efficiency of hydrolyzing an organic macromolecule into small organic molecules; under the action of pressurized gradient grinding, the nanometerization degree of the inorganic fertilizer is improved; and the small-molecular organic water-soluble fertilizer homogenized ultrasonically has enhanced solubility, and is not easy to produce a precipitate after long-term storage.

7 Claims, 4 Drawing Sheets

METHOD FOR PREPARING SMALL-MOLECULE ORGANIC WATER-SOLUBLE FERTILIZER USING BIOMASS AND ITS WASTE, AND PRODUCT AND APPLICATION THEREOF

CROSS REFERENCE TO RELATED APPLICATION

This applications claims priority to and takes the benefit of Chinese Patent Application No. 202310644937.1 filed on Jun. 1, 2023, the contents of which are herein incorporated by reference.

TECHNICAL FIELD

The present disclosure belongs to the field of resourceful treatment of organic wastes in a biomass, and in particular relates to a method for preparing a small-molecule organic water-soluble fertilizer, and a product and application thereof.

BACKGROUND

A traditional method of making an organic fertilizer from organic waste in biomass adopts a long-term fermentation method, which results in a large loss of nutrients, pollutes the environment, and has a poor effect of fermenting an organic fertilizer. An improved anaerobic biological acidification hydrolysis as adopted spends a long time and has a poor effect. The reaction time is long even if a high temperature chemical hydrolysis reaction is added at the back end. The primary crushing and fine crushing after impurity removal, and pulping are performed by using a mechanical high-speed pulping machine, which consumes a lot of power, has a short service life, and requires frequent maintenance. A trace element is added and mixed under stirring with a slurry, which has low efficiency of chelation and nanometerization, and a low degree of chelation, resulting in low utilization rate of biomass; the slurry hydrolysis has low efficiency and large energy consumption; a traditional chemical fertilizer mineral nutrition is combined with an organic fertilizer in a form of compounding or blending, so that the inorganic salt still exists in a free state, the loss of fertilizer mineral nutrients is large, the utilization rate is low, and the nanometerization and homogenization has a too long reaction time and low efficiency.

SUMMARY

In order to solve the problems of low degrees of chelation, nanometerization and homogenization and low efficiency of hydrolyzing small molecules, and to solve the problem of high energy consumption in a preparation process at the same time, the present disclosure provides a method for preparing a small-molecule organic water-soluble fertilizer, and a product and application thereof.

In a first aspect, a method for preparing a small-molecule organic water-soluble fertilizer adopts the following technical solution:

a method for preparing a small-molecule organic water-soluble fertilizer, including the following steps:

step (1). primarily crushing and finely dividing a biomass organic waste after impurity removal, evenly dividing into a pressure tank, subjecting to pressurization and pressure relief, and pulping by back and forth collision in an collision tank to obtain a slurry;

step (2). pouring the slurry obtained in the step (1) into a pressurized mixing tank, adding a trace element and a catalyst, and stirring in gradient to obtain a pre-chelation slurry;

step (3), performing hydrolysis and chelation on the pre-chelation slurry obtained in the step (2) in a hydrolysis tank to obtain a hydrolyzed slurry;

step (4), evenly dividing the hydrolyzed slurry obtained in the step (3) into three reaction tanks, adding a potassium source, a nitrogen source and a phosphorus source respectively, grinding in gradient, mixing, filtering, and centrifuging to obtain a composite nanometerized and mixed slurry;

step (5), subjecting the composite nanometerized slurry obtained in the step (4) to vacuum evaporation and concentration to remove excess moisture, so as to obtain a concentrated solution; and step (6), transferring the concentrated solution obtained in the step (5) to a homogenization tank, adding a stabilizer, stirring in gradient, and homogenizing ultrasonically to obtain the small-molecule organic water-soluble fertilizer.

By adopting the aforementioned technical solution, the biomass organic waste is subjected to pressurization and pressure relief and collided in the collision tank into a slurry, which greatly reduces energy consumption; the trace element and the catalyst are added for pre-chelation, and then chelation is completed through hydrolysis, an inorganic nutrient is added, nanometerized, homogenized, and vacuum-concentrated to produce the small-molecule organic water-soluble fertilizer. The efficiency of small molecularization, chelation, and nanometerization during the hydrolysis is high, and the product does not precipitate or delaminate after long-term storage, and thus has good stability.

Preferably, in the step (2), the trace element is a soluble salt, borate or molybdate of iron, manganese, copper or zinc; wherein, the soluble salt of iron, manganese, copper or zinc is calculated as a metal element, boric acid is calculated as boron, the molybdate is calculated as molybdenum, and the added total amount of the trace element is 0.5-3.0 wt % of the slurry.

Preferably, in the step (4), the potassium source, the nitrogen source, and the phosphorus source are calculated as pure nutrients $K_2O$, $N$ and $P_2O_5$, and the added total amount is 5-20 wt % of the; and the addition proportion of the $N:P_2O_5:K_2O$ is (0.8-1.0):(0.4-0.5):(0.7-0.9).

Preferably, in the step (6), the added amount of the stabilizer is 0.1-0.5 wt % of the concentrated solution; and the stabilizer is selected from one or more of polyacrylic acid, polyvinylalcohol, and polyvinylpyrrolidone.

By adopting the aforementioned technical solution, the addition of the trace element and the inorganic fertilizer is controlled to provide a plant with supplement of trace elements and macroelements while avoiding the enrichment of excessive macroelements in the soil to cause soil compaction and acidification problems; and excessive addition of a compound fertilizer is easy to cause loss of nutritional ingredients.

Preferably, in the step (1), the pressure tanks are coupled to symmetrical positions of the collision tank respectively and all pressurized to 0.3-0.8 MPa, a quick-opening valve of the pressure tanks is opened within a time of 1-5 s, and the slurry in the pressure tanks collides back and forth in the collision tank through a coupled connecting pipeline.

By adopting the aforementioned technical solution, the pressure tank is pressurized, the quick-opening valve is opened in a short time, and large-grained organic materials are collided and crushed in equal amounts. Compared with traditional crushing means, energy consumption is greatly saved with high efficiency and better slurrying effect.

Preferably, in the step (2), gradient stirring is carried out under conditions of a normal temperature and a pressure of 0.2-0.5 MPa; and the gradient stirring is that two stirring devices are installed in the pressurized mixing and reaction tank, one with a rotation speed of 30-50 r/min, and the other one with a rotation speed of 50-100 r/min;

and/or, in the step (3), two stirring devices are installed in the hydrolysis tank, one with a number of revolutions of 50-200 r/min, and the other one with a number of revolutions of 100-500 r/min; and the hydrolysis is conducted at a temperature of 110-160° C. and a pressure of 0.3-1.0 MPa for a time of 1-4 h;

and/or, in the step (4), two stirring-type grinding devices are installed in the reaction tank, one with a number of revolutions of 500-1,400 r/min and the other with a number of revolutions of 1,500-2,500 r/min; the pressure is 0.1-0.6 MPa; and the grinding time is 1-3 h.

By adopting the aforementioned technical solution, the differential stirring of the stirring devices in the pressurized mixing tank and the hydrolysis tank forms a gradient field, which enhances the efficiency of chelation and hydrolysis; and the two grinding devices in the reaction tank grind at different rotation speeds to improve the degree of nanometerization.

Preferably, in the step (5), a heat source for vacuum evaporation and concentration is water vapor at 120-180° C., an associated pressure of the water vapor is 0.2-0.8 Mpa, and it is pressurized to 0.5-1.0 MPa with an air compressor; and a solid content of the concentrated solution is 5-20 wt %.

By adopting the aforementioned technical solution, a compressed gas is utilized to pressurize the vapor into saturated water to release phase change latent heat and compression heat, and the release of the compression heat stabilizes the temperature of the vacuum evaporation and concentration, saving energy by 50% compared with vapor heating alone.

Preferably, in the step (6), two stirring devices are installed in the stabilization tank, one with a rotation speed of 50-100 r/min, and the other one with a rotation speed of 80-130 r/min, so as to enhance the stabilization effect. The ultrasonic frequency is 300-1,000 KHz, and the time for stabilization and homogenization is 0.5-2 h.

By adopting the aforementioned technical solution, two stirring devices and an ultrasonic device are disposed in the stabilization and homogenization tanks. Under the action of the stabilizer, gradient stirring and ultrasonic strengthening, the obtained small-molecule organic water-soluble fertilizer is stable, does not generate a precipitate, and does not delaminate, is long-acting and stable.

In a second aspect, a small-molecule organic water-soluble fertilizer adopts the following technical solution:

a small-molecule organic water-soluble fertilizer prepared by the method for preparing a small-molecule organic water-soluble fertilizer according to any one of the aforementioned items.

The organic matter content, water-insoluble matter, pH value, etc. all meet or superior over national standards.

The small-molecule organic water-soluble fertilizer prepared by adopting the aforementioned technical solution and preparation method has good stability, does not generate a precipitate, has balanced trace elements and macroelements, has long-lasting and good fertilizer efficiency, can be directly absorbed by crop roots in a pinocytosis manner, and has high fertilizer efficiency.

In a third aspect, an application of a small-molecule organic water-soluble fertilizer adopts the following technical solution:

an application of a small-molecule organic water-soluble fertilizer prepared by the method for preparing a small-molecule organic water-soluble fertilizer according to any one of the aforementioned items for crop planting.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and those of ordinary skills in the art may still derive other drawings from these accompanying drawings without creative efforts.

DETAILED DESCRIPTION OF THE EMBODIMENTS

Figure 1:
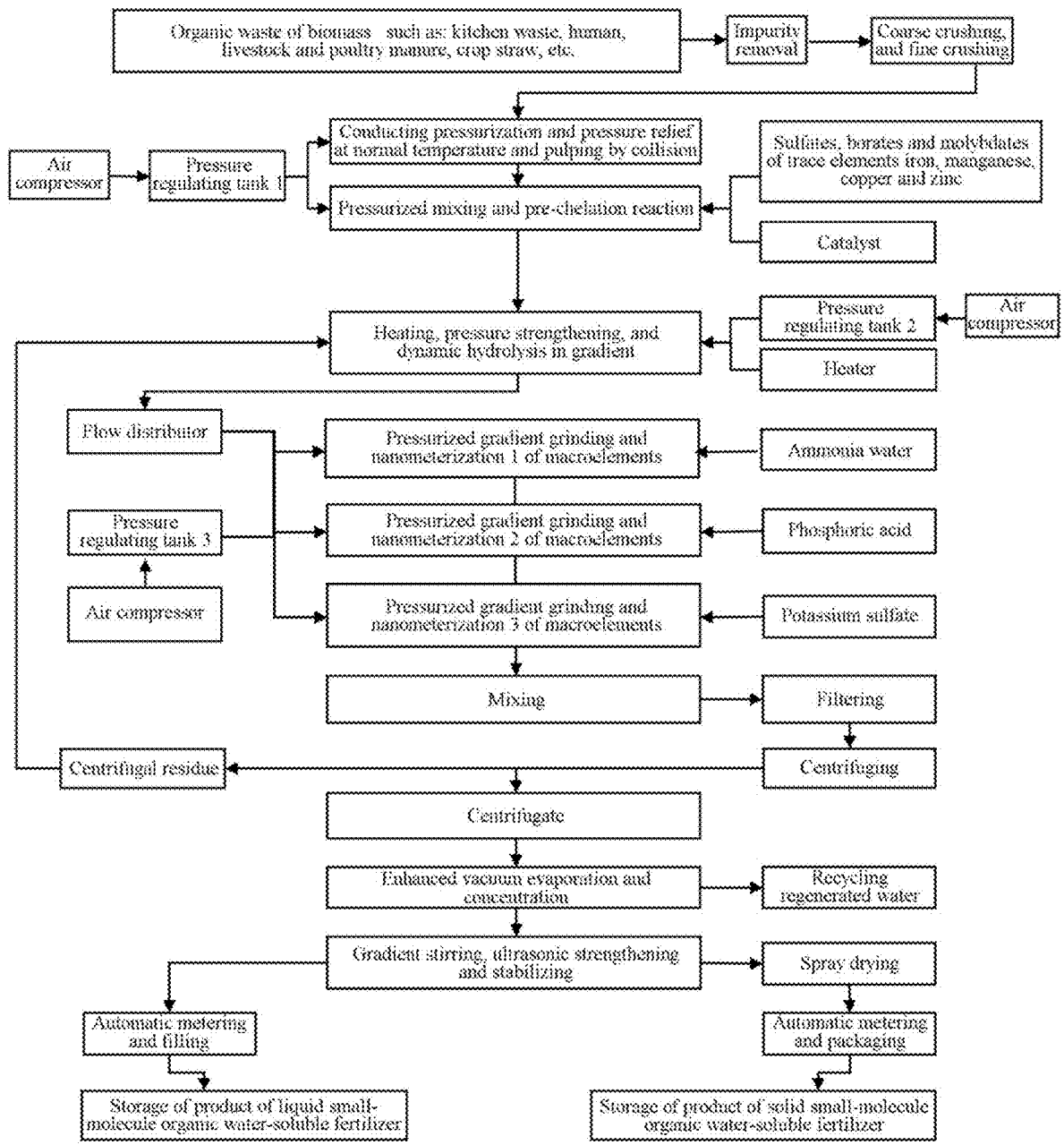
FIG. 1 is a process flow chart of Example 1.
Figure 2:
FIG. 2 is a photograph of weed growth of rice of a comparative example of Test Example 1.
Figure 3:
FIG. 3 is a photograph of weed growth of rice of Test Example 1.
Figure 4:
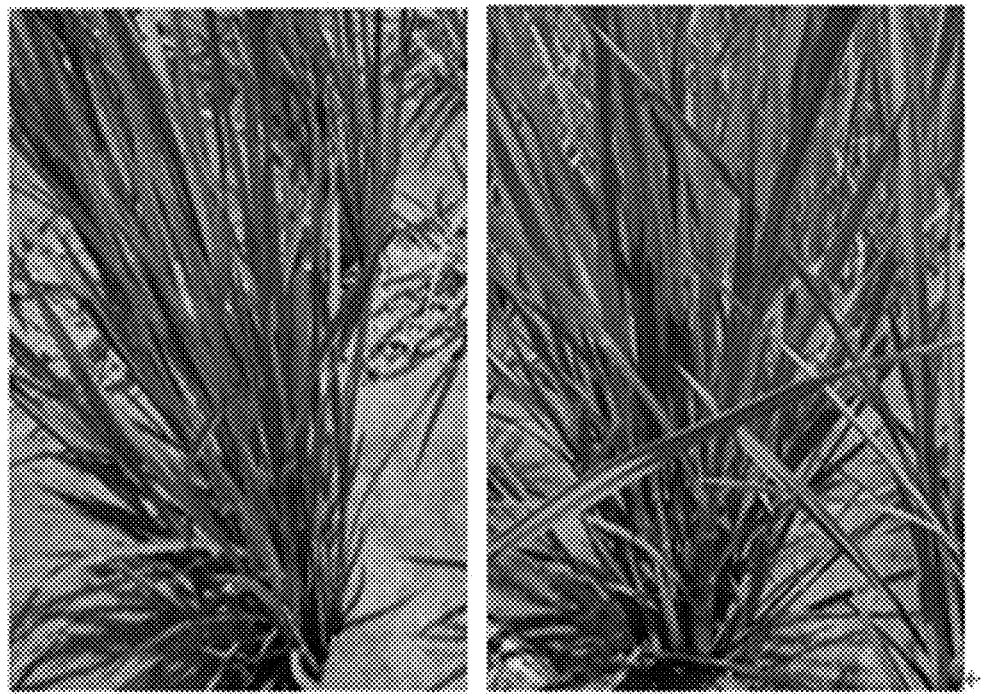
FIG. 4 is a comparison chart of overall growth vigour in the field of Test Example 1.
Figure 5:
FIG. 5 is a comparison chart of Test Example 1 on day 65 after transplanting.
Figure 6:
FIG. 6 is a comparison chart of Test Example 1 on day 95 after transplanting.
Figure 7:
FIG. 7 is a comparison chart of rice diseases and insect pests in Test Example 1.

In order to make the objects, technical solutions and advantages of the present disclosure more clear, the technical solutions of the present disclosure will be described in detail below. Apparently, the described embodiments are merely a part rather than all of the embodiments of the present disclosure. All other embodiments obtained by those of ordinary skills in the art based on the embodiments of the present disclosure without creative efforts are within the claimed scope of the present disclosure.

Example 1

S1. coarse crushing, fine crushing, pulping: After impurity removal, a kitchen waste of the organic waste in biomass, was first transported to a coarse crusher and a fine crusher, and the particle size of the solid after coarse crushing and fine crushing was less than 1 mm. After being finely crushed, it was evenly transported to two pressure tanks respectively equipped with quick-opening valves. The two quick-opening valves were connected to each other through a discharge pipeline communicated with the collision tank. The discharge pipeline had a diameter of 80 mm and a length of 0.5 m. After feeding into the two pressure tanks in equal amounts, it was pressurized to 0.5 MPa, the quick-opening valves were opened at the same time within 2 s, so that two streams collided with each other back and forth, and were finely crushed into a slurry.

S2. The added amount of sulfates of trace elements iron, manganese, copper, zinc was calculated as a metal, the added amount of the molybdates was calculated as molybdenum, the added amount of boric acid was calculated as boron, the added amount of them was 2.5 wt % of the slurry. A catalyst was added in an amount of 5% of the slurry, and fed together with the slurry into a pressurized mixing and reaction tank for gradient stirring and reaction. Two stirrers driven by two motors rotated at the same time with number of revolutions of 30 r/min and 50 r/min respectively. Under normal temperature, they was pressurized to 0.2 MPa and reacted for a time of 30 min, so that they were mixed and subjected to a pre-chelation reaction.

S3. The mixed and pre-chelated slurry prepared in the step S2 was catalytically hydrolyzed in a hydrolysis tank equipped with two stirrers. The two stirrers had different number of revolutions and thus formed different speed gradients. One stirrer had a number of revolutions of 50 r/min and the other one had a number of revolutions of 100 r/min Therefore, the number of collisions of the slurry components was increased and the hydrolysis effect was enhanced. The heating temperature was controlled at 110° C., and pressurization was conducted with an air compressor. On the basis of a vapor-related pressure, it was then pressurized to 0.3 Mpa to carry out catalytic hydrolysis for small molecularization of organic polymers into sugars, organic acids, amino acid peptides, fatty acids, sugar alcohols, nucleotides, and fulvic acid-like substances.

S4. The small molecule slurry obtained after the enhanced hydrolysis in the step S3 was fed into three reaction tanks in equal amounts, respectively, and each added with liquid potassium sulfate, ammonia water, and phosphoric acid through automatic metering, wherein the added amount was calculated as pure nutrients $K_2O$, $P_2O_5$, and N, the added total amount was 5 wt % of the small-molecule organic solution, and a proportion of $N:P_2O_5:K_2O$ was 1:0.5:0.8 for a general type. They were subjected to a nanometerization and homogenization reaction with the small-molecule organic solution, and mixed after being ground and reacted in the three reaction tanks. A gradient grinder is one set of grinding paddles driven by two motors, one of the two motors with a number of revolutions of 500 r/min and the other one with a two motors of 1,500 r/min, so as to generate a gradient velocity field to increase the number of grinding collisions and make the grinding complete. The sealed grinder was air-pressurized by a compressor, so that the added pressure was controlled at 0.1 MPa. The grinding time was 1 h, and the materials were nanometerized to 300-800 nanometers.

S5. Enhanced vacuum evaporation and concentration was conducted to remove excess moisture and recover regenerated water. The heat source for heating was water vapor at 120° C., which was then pressurized by an air compressor to exceed an associated pressure of the vapor of 0.5 MPa. Therefore, the vapor was pressurized into saturated water to release phase change latent heat and compression heat, which saved energy by 50% compared with vapor heating alone. The temperature was controlled not to decrease by releasing compression heat through air compression. Excess moisture was removed and regenerated water was recycled. The concentrated small-molecule organic water-soluble fertilizer was allowed to reach a concentration of 15 wt %.

S6. After the concentration was completed, it was added with a stabilizer, subjected to gradient stirring, ultrasonic strengthening and stabilization treatment, wherein two stirrers were used for gradient stirring, one with a rotation speed of 50 r/min and the other with a rotation speed of 80 r/min, and ultrasonic homogenization was conducted at a ultrasonic frequency of 300 KHz for 0.5 h. Finally, automatic metering was conducted, and the product was put into storage after filling.

The specific flow chart was shown in FIG. 1.

Example 2

S1. coarse crushing, fine crushing, pulping: Human, livestock and poultry manure in the organic waste of biomass, such as dehydrated human manure, chicken manure or dried pig manure or cow dung, was coarsely and finely crushed after impurity removal, wherein the particle size of the solid after fine crushing was less than 1 mm. It was evenly transported to two pressure tanks respectively equipped with quick-opening valves. The two quick-opening valves were connected to each other through a discharge pipeline communicated with the collision tank. The discharge pipeline had a diameter of 80 mm and a length of 0.5 m. It was pressurized to 0.28 MPa, then the quick-opening valves were opened at the same time within 2 s, so that two streams collided with each other back and forth, and were finely crushed into a slurry.

S2. The added amount of sulfates of trace elements iron, manganese, copper, zinc was calculated as a metal, the added amount of ammonium molybdate was calculated as molybdenum, the added amount of boric acid was calculated as boron, the added amount of them was 0.5 wt % of the slurry. A catalyst was added in an amount of 7% of the slurry, and fed together with the slurry into a pressurized mixing and reaction tank for gradient stirring and reaction. Two stirrers driven by two motors rotated at the same time with number of revolutions of 50 r/min and 100 r/min respectively. Under normal temperature, they was pressurized to 0.4 MPa by an air compressor and reacted for a time of 10 min.

S3. The slurry prepared in the step S2 was catalytically hydrolyzed in a hydrolysis tank equipped with two stirrers. The two stirrers had different number of revolutions and thus formed different speed gradients. One stirrer had a number of revolutions of 200 r/min and the other one had a number of revolutions of 500 r/min Therefore, the number of collisions of the slurry components was increased and the hydrolysis effect was enhanced. During catalytic hydrolysis, the heating temperature was controlled at 140° C., and pressurization was conducted with an air compressor. On the basis of a vapor-related pressure, it was then pressurized to 0.7 MPa for small molecularization of organic polymers into sugars, organic acids, amino acid peptides, fatty acids, sugar alcohols, nucleotides, and fulvic acid-like substances.

S4. The small molecule slurry obtained after the enhanced hydrolysis in the step S3 was fed into three reaction tanks in equal amounts, respectively, and each added with liquid potassium sulfate, ammonia water, and phosphoric acid through automatic metering, wherein the added amount was calculated as pure nutrients $K_2O$, $P_2O_5$, and N, the added total amount was 15 wt % of the small-molecule organic solution, and a proportion of $N:P_2O_5:K_2O$ was 0.8:0.4:0.7 for a general type. Finally, they were mixed together and subjected to a nanometerization and homogenization reaction with the small-molecule organic solution. A gradient grinder is one set of grinding paddles driven by two motors, one of the two motors with a number of revolutions of 1,000 r/min and the other one with a two motors of 2,000 r/min, so as to generate a gradient velocity field to increase the number of grinding collisions and make the grinding complete. The sealed grinder was air-pressurized by a compressor, so that the added pressure was controlled at 0.4 MPa.

The grinding time was 2 h, and the materials were nanometerized to 300-800 nanometers.

S5. Enhanced vacuum evaporation and concentration was conducted to remove excess moisture and recover regenerated water. The heat source for heating was water vapor at 120° C., which was then pressurized by an air compressor to exceed an associated pressure of the vapor of 0.8 MPa. Therefore, the saturated vapor was pressurized into saturated water to release phase change latent heat and compression heat, which saved energy by 50% compared with vapor heating alone. The temperature was controlled not to decrease by releasing compression heat through air compression. Excess moisture was removed and regenerated water was recycled. The concentrated organic water-soluble fertilizer was allowed to reach a concentration of 14 wt %.

S6. After the concentration was completed, it was added with a stabilizer, subjected to gradient stirring, ultrasonic strengthening and stabilization treatment, wherein two stirrers were used for stirring, one with a rotation speed of 80 r/min and the other with a rotation speed of 100 r/min, and ultrasonic homogenization was conducted at a ultrasonic frequency of 800 KHz for 1.5 h. Finally, automatic metering was conducted, and the product was put into storage after filling.

Example 3

S1. coarse crushing, fine crushing, pulping: Crop straw in the organic waste of biomass was coarsely and finely crushed after impurity removal, wherein the particle size of the solid after crushing was less than 1 mm. It was evenly transported to two pressure tanks respectively equipped with quick-opening valves. The two quick-opening valves were connected to each other through a discharge pipeline communicated with the collision tank. The discharge pipeline had a diameter of 80 mm and a length of 0.5 m. It was pressurized to 0.5 MPa, then the quick-opening valves were opened at the same time within 3 s, so that two streams collided with each other back and forth, and were finely crushed into a slurry.

S2. The added amount of sulfates and molybdates of trace elements iron, manganese, copper, zinc was calculated as a metal, the added amount of boric acid was calculated as boron, the added amount of them was 1 wt % of the slurry. A catalyst was added in an amount of 4% of the slurry, and fed together with the slurry into a pressurized mixing and reaction tank for gradient stirring and reaction. Two stirrers driven by two motors rotated at the same time with number of revolutions of 40 r/min and 50 r/min respectively. Under normal temperature, they was pressurized to 0.3 MPa by an air compressor and reacted for a time of 30 min.

S3. The slurry prepared in the step S2 was catalytically hydrolyzed in a hydrolysis tank equipped with two stirrers. The two stirrers had different number of revolutions and thus formed different speed gradients. One stirrer had a number of revolutions of 200 r/min and the other one had a number of revolutions of 500 r/min Therefore, the number of collisions of the slurry components was increased and the hydrolysis effect was enhanced. During catalytic hydrolysis, the heating temperature was controlled at 160° C., and pressurization was conducted with an air compressor. On the basis of a vapor-related pressure, it was then pressurized to 1.0 MPa for small molecularization of organic polymers into sugars, organic acids, amino acid peptides, fatty acids, sugar alcohols, nucleotides, and fulvic acid-like substances.

S4. The small molecule slurry obtained after the enhanced hydrolysis in the step S3 was fed into three reaction tanks, respectively, and each added with liquid potassium sulfate, ammonia water, and phosphoric acid through automatic metering, wherein the added amount was calculated as pure nutrients $K_2O$, $P_2O_5$, and N, the added total amount was 20 wt % of the small-molecule organic solution, and a proportion of $N:P_2O_5:K_2O$ was 1:0.6:0.8 for a general type. The general type was subjected to a nanometerization and homogenization reaction with the small-molecule organic solution, and finally mixed. A gradient grinder is one set of grinding paddles driven by two motors, one of the two motors with a number of revolutions of 1,400 r/min and the other one with a two motors of 2,500 r/min, so as to generate a gradient velocity field to increase the number of grinding collisions and make the grinding complete. The sealed grinder was air-pressurized by a compressor, so that the added pressure was controlled at 0.6 MPa. The grinding time was 3 h, and the materials were nanometerized to 300-800 nanometers.

S5. Enhanced vacuum evaporation and concentration was conducted to remove excess moisture and recover regenerated water. The heat source for heating was water vapor at 180° C., which was then pressurized by an air compressor to exceed an associated pressure of the vapor of 1.0 MPa. Therefore, the saturated vapor was pressurized into saturated water to release phase change latent heat and compression heat, which saved energy by 50% compared with vapor heating alone. The temperature was controlled not to decrease by releasing compression heat through air compression. Excess moisture was removed by vacuum evaporation and concentration, and regenerated water was recycled. The concentrated organic water-soluble fertilizer was allowed to reach a concentration of 20 wt %.

S6. After the concentration was completed, it was added with a stabilizer, subjected to gradient stirring, ultrasonic strengthening and stabilization treatment, wherein two stirrers were used for stirring, one with a rotation speed of 100 r/min and the other with a rotation speed of 130 r/min, and ultrasonic homogenization was conducted at a ultrasonic frequency of 1,000 KHz for 2 h. Finally, automatic metering was conducted, and the product was put into storage after filling.

COMPARATIVE EXAMPLES

Comparative Example 1

The method for preparing an organic water-soluble fertilizer provided in Comparative Example 1 was different from that of Example 3 in that the step S2 was carried out under normal pressure.

Comparative Example 2

The method for preparing an organic water-soluble fertilizer provided in Comparative Example 2 was different from that of Example 3 in that in the step S2, a stirrer is disposed in a reaction tank, and the rotation speed for stirring was 50 r/min.

Comparative Example 3

The method for preparing an organic water-soluble fertilizer provided in Comparative Example 3 was different from that of Example 3 in that in the step S2, the rotation speeds for stirring of the two stirrers installed in the reaction tank were both 50 r/min.

Comparative Example 4

The method for preparing an organic water-soluble fertilizer provided in Comparative Example 4 was different from that of Example 3 in that in the step S3, the catalytic hydrolysis was carried out under normal pressure.

Comparative Example 5

The method for preparing an organic water-soluble fertilizer provided in Comparative Example 5 was different from that of Example 3 in that in the step S3, the rotation speeds for stirring of the two stirrers were both 500 r/min.

Comparative Example 6

The method for preparing an organic water-soluble fertilizer provided in Comparative Example 6 was different from that of Example 3 in that in the step S3, the hydrolysis was carried out under a condition of a normal temperature of 25° C.

Comparative Example 7

The method for preparing an organic water-soluble fertilizer provided in Comparative Example 7 was different from that of Example 3 in that in the step S4, the two grinders installed in the reaction tank had a rotation speed for grinding of 2,500 r/min.

Comparative Example 8

The method for preparing an organic water-soluble fertilizer provided in Comparative Example 8 was different from that of Example 3 in that in the step S4, the two grinders were replaced with two stirrers, and the rotational speeds of the two stirrers were both 300 r/min.

Comparative Example 9

The method for preparing an organic water-soluble fertilizer provided in Comparative Example 9 was different from that of Example 3 in that in the step S4, the two grinders were replaced with two stirrers, one with a rotation speed of 200 r/min, and the other with a rotation speed of 500 r/min.

Comparative Example 10

The method for preparing an organic water-soluble fertilizer provided in Comparative Example 10 was different from that of Example 3 in that the step S4 was carried out under normal pressure.

Comparative Example 11

The method for preparing an organic water-soluble fertilizer provided in Comparative Example 11 was different from that of Example 3 in that in the step S5, only a stabilizer was added, and a stirrer was used at a rotation speed of 500 r/min.

Comparative Example 12

The method for preparing an organic water-soluble fertilizer provided in Comparative Example 12 was different from that of Example 3 in that in the step S5, only a stabilizer was added, and the rotation speeds of the two stirrers were both 500 r/min.

Comparative Example 13

The method for preparing an organic water-soluble fertilizer provided in Comparative Example 13 was different from that of Example 3 in that in the step S5, only a stabilizer was added, and the rotation speeds for gradient stirring of the two stirrers were 200 r/min and 500 r/min respectively. No ultrasonic generator was used.

Comparative Analysis of Effects

In Examples 1-3, the chelating rate of the trace elements to organic matter was 100%. Compared with Comparative Examples 1-3, the chelating rate of the trace elements to organic matter in Example 1-3 was greatly improved, and the chelating rate was increased by 30-50%.

In Examples 1-3, the degree of catalytic hydrolysis reached 100%. Compared with Comparative Examples 4-6, the content of small molecules in Examples 1-3 was increased by 20-36%.

In Examples 1-3, the degree of nanometerization was above 95%, while in Comparative Examples 7-10, the degree of nanometerization was 30-40%.

The small-molecule organic water-soluble fertilizers obtained in Examples 1-3 did not produce a precipitate at the bottom within 30 days of long-term storage; while the small-molecule organic water-soluble fertilizers obtained in Comparative Examples 11-13 all produced precipitates with different masses after 30 days of long-term storage, and the solution was turbid.

Effect Test

Screening of Process Conditions in Grinding Test of Step (4)

Operation was conducted according to the process of the step (4), and the number of revolutions of the grinders was controlled, with one with a number of revolutions of 1,000 r/min, and the other with a number of revolutions of 2,400 r/min. The grinding time and nanometerization were investigated. The specific data were shown in Table 1 below.

TABLE 1

| | Grinding time in min | | | |
|---|---|---|---|---|
| | 30 minutes | 60 minutes | 120 minutes | 180 minutes |
| Nanometerization size | 800 | 600 | 430 | 300 |

From the aforementioned data, it could be seen that the use of two grinders could significantly improve the nanometerization degree of the fertilizer, and the grinding time had a great relationship with the nanometerization degree.

Detection of Nanometerization Degree of Product

The nanometerization degree of the prepared organic water-soluble fertilizer was detected by a conventional method, and the data was shown in Table 2 below.

TABLE 2

| | Example 1 | Example 2 | Example 3 |
|---|---|---|---|
| Nanometerization degree (%) | 95.8 | 96.7 | 98.2 |

It could be seen from the aforementioned tests that the nanometerization degree of the fertilizer prepared by the present disclosure was very high.

The detection data of the composition of the organic fertilizer was shown in Table 3 below.

TABLE 3

| Test items | Example 1 | Example 2 | Example 3 |
|---|---|---|---|
| Water-insoluble matter (g/L) | 4.2 | 3.3 | 2.5 |
| Organic matter content (g/L) | 113 | 115 | 118 |
| Total amount of nitrogen, phosphorus and potassium (g/L) | 82 | 87 | 95 |
| Content of trace element (g/L) | 24 | 21 | 23 |
| PH value | 2.8 | 3.6 | 3.3 |
| Mercury (mg/kg) | not detectable | not detectable | not detectable |
| Arsenic (mg/kg) | 0.3 | 0.2 | 0.3 |
| Cadmium (mg/kg) | not detectable | not detectable | not detectable |
| Lead (mg/kg) | 3.5 | 3.2 | 3.4 |
| Chromium (mg/kg) | 2.0 | 1.9 | 2.0 |

As could be seen from the aforementioned data, the organic water-soluble fertilizer prepared by the present disclosure had very little water-insoluble matter, and relatively high content of organic matter, which meant that the degree of nanometerization of the present disclosure was relatively high, and the content of heavy metals was also relatively low, indicating that the heavy metal content of the fertilizer prepared from the kitchen waste was fully up to the standard.

Fertilizer Efficiency Test

TEST EXAMPLE

This test example was a large-scale field experiment on the promotion effect of the novel liquid small-molecule organic water-soluble fertilizer on rice yield.

Fertilizer to be tested:
a small-molecule organic water-soluble fertilizer (base fertilizer: 90 g/L of N, 40 g/L of P, and 30 g/L of K; tillering fertilizer: 80 g/L of N, 30 g/L of P, and 80 g/L of K; jointing fertilizer: 50 g/L of N, 15 g/L of P, and 70 g/L of K; and earing fertilizer: 20 g/L of N, 15 g/L of P, and 80 g/L of K);
a chlorine first compound fertilizer with N:P:K=12:15:12, and urea having 46% of N.

The crop to be tested was rice varieties: Songzaoxiang No. 1;
Sowing method: mechanical transplanting of rice, and machine hole sowing
Preceding crop: rice
Test design: field controlled experiment;
The comparison of fertilizers used during the whole growth period was as follows:
Test group: Small-molecule organic water-soluble fertilizer
60 kg/mu of the base fertilizer, 40 kg/mu of the tillering fertilizer, 35 kg/mu of the jointing fertilizer, and 35 kg/mu of the earing fertilizer;
Control group: Chlorine first compound fertilizer+urea
40 kg/mu of the compound fertilizer as the base fertilizer, 15 kg/mu of urea as the tillering fertilizer, 20 kg/mu of the compound fertilizer as a medical fertilizer, 10 kg/mu of urea as the jointing fertilizer, 10 kg/mu of the compound fertilizer, 18 kg/mu of urea as a spikelet-promoting fertilizer, and 15 kg/mu of urea as a spikelet-promoting fertilizer.

Result Analysis

Songzaoxiang No. 1

The total average yield per mu of the two test fields in the test group was 522.3 kg/mu, and the average yield per mu in the control group was 439 kg/mu, and thus the yield of the test group was increased by 18.9%.

As could be seen from the aforementioned comparison tests, the small-molecule organic water-soluble fertilizer prepared by the present disclosure was obviously superior to conventional fertilizers in resistance to diseases and insect pests as well as yield and the quality of rice, and the fertilizer efficiency of the small-molecule organic water-soluble fertilizer prepared by the present disclosure was remarkable.

The above is only a specific embodiment of the present disclosure, but the scope of the present disclosure is not limited thereto, and changes or substitutions can easily come into the mind of those skilled in the art within the technical scope disclosed by the present disclosure. These changes or substitutions shall fall into the claimed scope of the present disclosure. Therefore, the claimed scope of the present disclosure should be determined by the claimed scope of the appended claims.

What is claimed is:

1. A method for preparing a small-molecule organic water-soluble fertilizer, comprising the following steps:
   step (1), primarily finely crushing and finely dividing a biomass organic waste after impurity removal, evenly dividing into a pressure tank, subjecting to pressurization and pressure relief, and obtaining a slurry by back and forth collision in a collision tank;
   step (2), pouring the slurry obtained in the step (1) into a gradient pressurized mixing tank, adding trace elements and a catalyst, and gradient stirring to obtain a pre-chelation slurry;
   step (3), performing small molecule hydrolysis of pulp and complete chelation with trace elements on the pre-chelation slurry obtained in the step (2) in a gradient catalytic hydrolysis tank to obtain a fully chelated slurry by catalytic hydrolysis of small molecules;
   step (4), evenly dividing the fully chelated slurry by catalytic hydrolysis of small molecules obtained in the step (3) into three gradient reaction tanks, adding a potassium source, a nitrogen source and a phosphorus source respectively, performing gradient reaction, followed by grinding, mixing, filtering, centrifuging, filtering residue and centrifugal residue return grinding to obtain a composite nanometerized slurry;
   step (5), subjecting the composite nanometerized slurry obtained in the step (4) to vacuum evaporation and concentration to obtain a concentrated solution;
   step (6), transferring the concentrated solution obtained in the step (5) to a stabilization tank, adding a stabilizer, gradient stirring, and homogenizing ultrasonically to obtain the small-molecule organic water-soluble fertilizer;
   wherein in step (1), the pressure tanks are coupled to symmetrical positions of the collision tank respectively, each pressurized to 0.3-0.8 MPa, a quick-opening valve of the pressure tanks is opened within a time of 1-5 seconds, and the slurry in the pressure tanks collides back and forth in the collision tank through a coupled connecting pipeline;

and wherein in step (4), the three gradient reaction tanks are independently controlled.

2. The method for preparing a small-molecule organic water-soluble fertilizer according to claim 1, wherein in the step (2), the trace element is a soluble salt, borate or molybdate of iron, manganese, copper or zinc; wherein, the soluble salt of iron, manganese, copper or zinc is calculated as a metal element, boric acid is calculated as boron, the molybdate is calculated as molybdenum, and the added amount of the trace element is 0.5-3.0 wt % of the slurry.

3. The method for preparing a small-molecule organic water-soluble fertilizer according to claim 1, wherein in the step (4), the potassium source, the nitrogen source, and the phosphorus source are calculated as pure nutrients $K_2O$, N and $P_2O_5$, and the added total amount is 5-20 wt % of the hydrolyzed slurry; and the addition proportion of the $N:P_2O_5:K_2O$ is (0.8-1.0):(0.4-0.5):(0.7-0.9).

4. The method for preparing a small-molecule organic water-soluble fertilizer according to claim 1, wherein in the step (6), the added amount of the stabilizer is 0.1-0.5 wt % of the concentrated solution; and the stabilizer is selected from the group consisting of: polyacrylic acid, polyvinylalcohol, and polyvinylpyrrolidone.

5. The method for preparing a small-molecule organic water-soluble fertilizer according to claim 1, wherein in the step (2), gradient stirring is carried out under conditions of a normal temperature and a pressure of 0.2-0.5 MPa; and the gradient stirring is that two stirring devices are installed in the pressurized mixing and reaction tank, one with a rotation speed of 30-50 r/min, and the other one with a rotation speed of 50-100 r/min;

and/or, in the step (3), two stirring devices are installed in the gradient catalytic hydrolysis tank, one with a rotation speed of 50-200 r/min, and the other one with a rotation speed of 100-500 r/min; and the catalytic hydrolysis is conducted at a temperature of 110-160° C. and a pressure of 0.3-1.0 MPa for a time of 1-4 hours;

and/or, in the step (4), two stirring-type grinding devices are installed in the three gradient reaction tanks, one with a rotation speed of 500-1,400 r/min and the other with a rotation speed of 1,500-2,500 r/min; the pressure is 0.1-0.6 MPa; and the grinding time is 1-3 hours.

6. The method for preparing a small-molecule organic water-soluble fertilizer according to claim 1, wherein in the step (5), a heat source for vacuum evaporation and concentration is water vapor at 120-180° C., a pressure of an air compressor is 0.5-1.0 MPa, and a solid content of the concentrated solution is 5-20 wt %.

7. The method for preparing a small-molecule organic water-soluble fertilizer according to claim 1, wherein in the step (6), two stirring devices are installed in the homogenization tank, one with a rotation speed of 50-100 r/min, and the other one with a rotation speed of 80-130 r/min; the ultrasonic frequency is 300-1,000 KHz, and the homogenization time is 0.5-2 h.

* * * * *

UNITED STATES PATENT AND TRADEMARK OFFICE
CERTIFICATE OF CORRECTION

| | | |
|---|---|---|
| PATENT NO. | : 12,037,299 B1 | Page 1 of 1 |
| APPLICATION NO. | : 18/234926 | |
| DATED | : July 16, 2024 | |
| INVENTOR(S) | : Wenzhi Liu et al. | |

It is certified that error appears in the above-identified patent and that said Letters Patent is hereby corrected as shown below:

On the Title Page

Item (71) The Applicants list should read as follows:
--Min He; Wenzhi Liu; Lecheng Xiao; Poxi He--

Signed and Sealed this
Seventeenth Day of September, 2024

*Katherine Kelly Vidal*

Katherine Kelly Vidal
*Director of the United States Patent and Trademark Office*